United States Patent Office 2,832,214
Patented Apr. 29, 1958

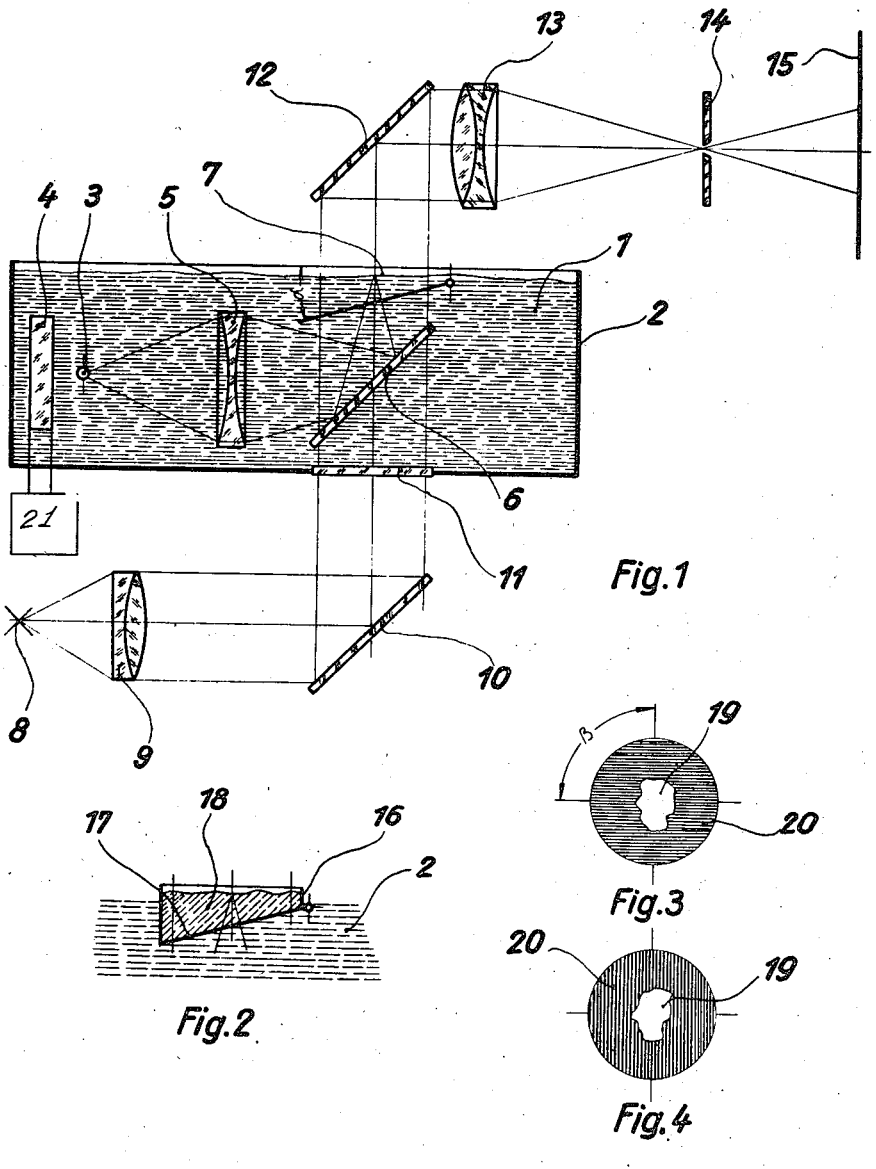

2,832,214

ARRANGEMENT FOR ULTRASONIC MATERIAL TESTING

Herbert Trommler, Kahla, Germany, assignor to VEB Carl Zeiss Jena, Jena, Germany Application August 5, 1954, Serial No. 448,103

2 Claims. (Cl. 73—67.6)

For the purpose of depicting objects with the aid of ultrasonic oscillations a method is known in which a relief image of the object to be depicted is formed by elevations of the surface of a liquid. According to this method, which has been described by K. Schuster in the "Jenaer Jahrbuch 1951" published by G. Fischer, Jena (Germany), pages 217 to 228, the ultrasonic radiation energy in reciprocal action with the gravity produces elevations of the surface of the liquid which are dependent on the ultrasonic intensity. An image of the object is therefore reproduced immediately in relief on the surface of the liquid. This relief is reproduced as an image on a screen or frosted glass by means of a schlieren arrangement. Yet, when employing said method only the slopes of the relief-image, i. e., only the contours of the depicted object and of the defects contained therein will be visible so that it will not in any case be readily possible to discriminate between the places where the ultrasonic oscillations are interrupted or not and therefore to identify the location of defects or flaws in the material. By way of a makeshift one may simultaneoulsly depict a rod or a wire net arranged in front of the object which would not then appear in the image at the places where the ultrasonic oscillations are interrupted by a defect in the object. As this auxiliary means must be attached to the test-object proper it is bound to complicate the testing procedure. Nor is it applicable in every case, since, in order to obtain a well-defined image, the wires of the net must have a certain thickness depending upon the frequency used and according to the resolving power. They, consequently, cover up parts of the object under examination so that minute defects are not discernible. It is furthermore indispensable that the additionally depicted auxiliary means be located within the object-distance of the lens. In test-objects of greater thickness it will not be possible however to locate such a net or rod within the object-distance and to depict it together with the object.

It is an object of the invention to provide an arrangement for ultrasonic material testing purposes, which readily permits to identify the location of defects or flaws in the object under examination. In accordance with the invention this is achieved by the additional formation upon the relief-image of a system of parallel bands or concentric rings, produced by interfering sound rays.

This can be effected, for instance, by disposing on the surface of the coupling fluid, which serves as the image plane, a receptacle consisting of a frame and a foil extended over the lower end of said frame and forming the bottom of said receptacle which contains a thin layer of a second fluid medium on the surface of which a relief-image of the object is produced. This frame may be pivotally mounted to the upper portion of the tank containing the coupling fluid and may be swung downwardly so that the bottom of the receptacle is at angle with respect to the surface of the coupling fluid and the second fluid medium in the receptacle. While the thin foil forming the bottom of the receptacle is highly permeable to sound, its reflective capacity is nevertheless sufficient to cause the production of interference phenomenae by the sound energy which flows back and forth within the wedge formed by the oblique-positioned foil and the surface of the fluid. The relief-image then contains a system of interference bands in correspondence with the position of the frame relative to the surface of the coupling fluid, said system of interfering bands showing interruptions at those points of the image where defects in the material of the object under examination are present. Alternatively it is possible to employ a foil forming a cone-shaped bottom of the receptacle. In this case concentric rings will be produced in place of interference bands, said rings being likewise interrupted at points, where the ultrasonic oscillations are interrupted.

In the accompanying drawings Fig. 1 shows diagrammatically an arrangement for the production of ultrasonic images for material testing purposes in which the invention may be applied. One embodiment of the arrangement according to the invention is diagrammatically shown in Fig. 2. In the Figs. 3 and 4 there are shown images of an object obtained with an arrangement according to the invention.

Referring now to Fig. 1 a tank 2 filled with a coupling fluid 1, as water for instance, contains the optical part of the ultrasonic device. The object 3 to be depicted is situated between a sound transducer 4 excited by a high-frequency generator 21, and an ultrasonic collecting lens 5. Via the lens 5 and a glass plate 6, which latter inclines towards the horizontal at an angle of 45° and acts as a reflector, a relief-image of the object is in known manner produced upon the surface of the water marked 7. With the aid of an optical schlieren device which is described for example by R. W. Wood in the "Philosophical Magazine," London, 1900 (5) 50, pages 347–349, the relief-image can be rendered distinctly visible. This may be effected by means of the following components, viz., a point light source 8, a collecting lens 9, a plane-mirror 10, a window 11 installed in the tank 2, a second plane-mirror 12, a collecting lens 13, a schlieren diaphragm 14 and an image screen 15.

As shown in Fig. 2, a receptacle consisting of a pivotally mounted frame 16 with a foil 17 fixed therein is disposed at the respective point where the relief-image 7 is formed upon the surface of the coupling fluid 1. The foil 17 may be of any thermoplastic or thermosetting composition, e. g., "perfol." The receptacle formed by the frame 16 and the foil 17 contains a second fluid medium 18 for example water. When the frame is in normal position, i. e., when the foil 17 is at right angles to the sound ray, the latter passes through the foil without noticeable variation and forms a relief-image upon the surface of the fluid 18. However, when so positioning the frame that the foil 17 forms a small angle $\alpha$ relative to the surface of the fluid, interfering sound rays also produce on the surface of the fluid a system of parallel bands. The relief-image together with the system of bands is depicted upon the screen 15 by means of the schlieren arrangement illustrated in Fig. 1. Fig. 3 illustrates such an image of a circular plate. In those plates where the material to be tested contains shrinkholes or flaws etc., no sound will be transmitted thus resulting in a void of the formation of interference bands. In Fig. 3 the section 19 for instance indicates a defect in the material of the plate, whereas the remaining part contains uninterrupted interference bands 20 thus indicating that the structure of the respective part of the plate is faultless.

In order to facilitate the legibility of the image and depending upon the location of the defect, the frame together with the foil may be rotated about a small angle $\alpha$ (Fig. 1), thus resulting in the image in a corresponding rotation β of the position of the interference bands 20, as demonstrated in Fig. 4.

I claim:

1. An arrangement for ultrasonic material testing purposes comprising a source of electrical oscillations, a tank containing a first fluid medium, an ultrasonic transducer excited by said source of electrical oscillations so as to generate ultrasonic rays travelling from said transducer through said first fluid medium, an ultrasonic collecting lens arranged in the path of said ultrasonic rays so as to form a relief-image of an object brought in the path of rays between said transducer and said lens, said relief-image being formed by elevations of the surface of a fluid medium bordering another medium and a receptacle consisting of a frame and a transparent foil extended over the lower end of said frame and forming the bottom of said receptacle, said frame being pivotally mounted to the upper portion of said tank, said receptacle containing a thin layer of a second fluid medium being swung downwardly so that the bottom is at an angle with respect to the surface of said second fluid medium and being disposed so that said relief-image is produced together with a system of interference bands corresponding to said angle on the surface of said second fluid medium, a window being provided in the bottom of said tank for directing a beam of light through said first fluid medium and thence through said second fluid medium in said receptacle in a direction normal to the surface of said second fluid medium, said beam of light appertaining to an optical schlieren device being provided for making visible said relief-image together with said interference bands on an image screen.

2. An arrangement for ultrasonic material testing purposes comprising a source of electrical oscillations, a tank containing a first fluid medium, an ultrasonic transducer excited by said source of electrical oscillations so as to generate ultrasonic rays travelling from said transducer through said first fluid medium, an ultrasonic collecting lens arranged in the path of said ultrasonic rays so as to form a relief-image of an object brought in the path of rays between said transducer and said lens, said relief-image being formed by elevations of the surface of a fluid medium bordering another medium and a receptacle consisting of a frame and a transparent foil extended over the lower end of said frame and forming a bottom of conical shape for said receptacle, said frame being pivotally mounted to the upper portion of said tank, said receptacle containing a thin layer of a second fluid medium being swung downwardly so that the bottom is at an angle with respect to the surface of said second fluid medium and being disposed so that said relief-image is produced together with a system of interference rings corresponding to said angle on the surface of said second fluid medium, a window being provided in the bottom of said tank for directing a beam of light through said first fluid medium and thence through said second fluid medium in said receptacle in a direction normal to the surface of said second fluid medium, said beam of light appertaining to an optical schlieren device being provided for making visible said relief-image together with said interference rings on an image screen.

References Cited in the file of this patent

UNITED STATES PATENTS 2,592,222    Williams    Apr. 8, 1952

OTHER REFERENCES

Publication: Scientific American, July 1944 issue, pp. 8, 9 and 11, article by Keith Henney.

Publication: Journal of Applied Physics, March 1949 issue, pp. 286–294, article by R. B. Barnes and C. J. Burton.